(12) United States Patent  
Nakai et al.

(10) Patent No.: US 10,174,838 B2  
(45) Date of Patent: Jan. 8, 2019

(54) SPEED CHANGE DEVICE FOR MOTORCYCLE

(71) Applicant: HONDA MOTOR CO., LTD., Minato-ku, Tokyo (JP)

(72) Inventors: Yusuke Nakai, Wako (JP); Taito Kobayashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 107 days.

(21) Appl. No.: 15/407,674

(22) Filed: Jan. 17, 2017

(65) Prior Publication Data

US 2017/0204971 A1   Jul. 20, 2017

(30) Foreign Application Priority Data

Jan. 20, 2016   (JP) ................. 2016-009245

(51) Int. Cl.
*F16H 63/30*   (2006.01)
*F16H 63/18*   (2006.01)
*B62M 25/06*   (2006.01)
(Continued)

(52) U.S. Cl.
CPC ............ *F16H 63/18* (2013.01); *B62M 25/06* (2013.01); *F16H 57/02* (2013.01); (Continued)

(58) Field of Classification Search
CPC .............................................. F16H 2063/3076
See application file for complete search history.

(56) References Cited

U.S. PATENT DOCUMENTS 8,037,779 B2 *  10/2011  Shiozaki ............... F16H 63/18  
74/473.36  
8,365,856 B2   2/2013  Kashiwai et al.  
(Continued)

FOREIGN PATENT DOCUMENTS

JP   2000-135940 A   5/2000  
JP   2002-293152 A   10/2002  
(Continued)

OTHER PUBLICATIONS

Office Action dated Jul. 4, 2017 in the corresponding Japanese patent application 2016-009245.

*Primary Examiner* — Tisha D Lewis  
(74) *Attorney, Agent, or Firm* — Carrier Blackman & Associates, P.C.; William D. Blackman; Joseph P. Carrier (57) ABSTRACT

A speed change device for a motorcycle has a lost motion mechanism associated with a shift rod of a link mechanism that transmits an operating force applied to a shift operating member to a shift spindle. The speed change device is provided with a shift stroke sensor that detects an amount of expansion/contraction stroke of the shift rod and with a shift spindle sensor that detects rotation of the shift spindle. Further provided is an output control device that controls the output of an internal combustion engine on the basis of detection signals of the shift stroke sensor and the shift spindle sensor. The shift spindle has a detection-target recessed portion formed by recessing a part of a cylindrical outer circumferential surface of the shift spindle. The shift spindle sensor detects the rotation of the shift spindle in cooperation with the detection-target recessed portion.

16 Claims, 9 Drawing Sheets

(51) Int. Cl.
*F16H 57/02* (2012.01)
*F16H 59/38* (2006.01)
*F16H 61/00* (2006.01)
*F16H 63/50* (2006.01)
*F16H 59/02* (2006.01)
*F16H 59/04* (2006.01)

(52) U.S. Cl.
CPC ....... *F16H 59/0217* (2013.01); *F16H 59/044* (2013.01); *F16H 59/38* (2013.01); *F16H 61/0006* (2013.01); *F16H 63/50* (2013.01); *F16H 63/502* (2013.01); *F16H 2059/0234* (2013.01); *F16H 2059/0239* (2013.01)

(56) References Cited

U.S. PATENT DOCUMENTS

| | | | |
|---|---|---|---|
| 9,057,436 B1* | 6/2015 | Itoo | F16H 63/30 |
| 9,383,011 B2 | 7/2016 | Tetsuka et al. | |
| 2010/0242655 A1* | 9/2010 | Ieda | F16H 63/14 |
| | | | 74/473.1 |
| 2015/0094919 A1* | 4/2015 | Nozaki | F16H 61/0213 |
| | | | 701/56 |
| 2018/0003299 A1* | 1/2018 | Ebina | F16H 63/30 |

FOREIGN PATENT DOCUMENTS

| | | |
|---|---|---|
| JP | 2003-307435 A | 10/2003 |
| JP | 2009-250307 A | 10/2009 |
| JP | 5238464 B2 | 7/2013 |
| JP | 2014-163342 A | 9/2014 |
| JP | 2015-028378 A | 2/2015 |

\* cited by examiner

SPEED CHANGE DEVICE FOR MOTORCYCLE

TECHNICAL FIELD

The present invention relates to a speed change device for a motorcycle.

BACKGROUND ART

When there is a speed change operation in a motorcycle, particularly at the time of an upshift, a clutch operation is generally performed to smoothly disengage a dog clutch of the transmission, that is, to disengage a speed change clutch.

However, it is known that in a case where a quick speed change operation is desired, particularly in a case of a race-specification vehicle or the like, the output of an internal combustion engine is decreased without a clutch operation being performed, and a torque transmitted to a transmission is thereby reduced to enable smooth changing of a speed change stage (see, for example, Patent Document 1).

PRIOR ART DOCUMENT

Patent Document

[Patent Document 1]
Japanese Patent No. 5238464

In the invention described in Patent Document 1, a first link mechanism that transmits an operating force, applied to a shift pedal, to a shift spindle is provided with a first switch and a second switch that are turned ON or OFF according to a shift pedal operation load and a third switch that is turned ON or OFF according to the rotation of a shift shaft (shift spindle) at the time of a shift operation. The output of an internal combustion engine is controlled on the basis of detection signals of the first and second switches and the third switch so that speed change switching can be performed smoothly.

Specifically, when there is an upshift operation, the output of the internal combustion engine is decreased during a period from detection of the shift operation by the first and second switches to detection by the third switch of a predetermined rotation of the shift shaft, which rotation causes speed change switching to be performed. The torque transmitted to the transmission is thereby reduced to enable smooth changing of a speed change stage without performing a clutch operation.

SUMMARY OF THE INVENTION

Problems to be Solved by the Invention

The third switch disclosed in Patent Document 1 has a structure in which a rotary plate is fitted to an input side end portion of the shift shaft penetrating a fixed plate, and an electrode provided to the fixed plate is biased by a spring and projected to an electrode provided to a revolving end of the rotary plate.

In a normal state in which the shift shaft is not rotated, the electrode on the fixed plate side is in contact with the electrode on the rotary plate side, so that the third switch is in an ON state. When the shift shaft is rotated, the rotary plate is rotated, and the electrode on the rotary plate side is separated from the electrode on the fixed plate side, so that the third switch is set in an OFF state.

A rotary piece (shift arm) of the first link mechanism to which a shift pedal operating force is transmitted is fitted on an input side of the shift shaft. A ratchet arm of a second link mechanism is fitted to an end portion on an output side of the shift shaft.

In this structure, the rotary piece and the ratchet arm need to be fitted to the shift shaft while maintaining a fixed relative positional relation to each other, and the rotary plate as a separate body needs to be attached to the shift shaft with high accuracy while maintaining a predetermined positional relation to the rotary piece and the ratchet arm. Therefore assembly is not easy.

Then, at the time of the assembly, when the rotary plate is first fastened to the shift shaft, an assembly procedure is fixed, so that the assembly is made difficult or the assembly may be made impossible.

In addition, a base end portion of the rotary plate as a long piece is fitted to the shift shaft, and an electrode is provided to the revolving end portion of the rotary plate. Thus, the structure tends to cause a displacement. In order to increase detection accuracy, the rotary plate needs to be fastened to the shift shaft more accurately and firmly, and a high machining accuracy is required, which results in an increase in cost.

The present invention has been made in view of such points. It is an object of the present invention to provide a speed change device for a motorcycle which device is excellent in assemblability of a shift spindle without a high machining accuracy being required, while maintaining an excellent accuracy of detection of rotation of the shift spindle.

Means for Solving the Problems

In order to achieve the above object, according to the present invention, there is provided a speed change device for a motorcycle including: a shift operating member, a shift spindle, a link mechanism connecting the shift operating member to the shift spindle so as to rotate the shift spindle according to an operation of the shift operating member, a shift drum, a shift drum driving mechanism for rotating the shift drum by transmitting rotation of the shift spindle to the shift drum, and a shift fork engaging with the shift drum to select one speed change stage by transmitting rotation of the shift drum to a shifter gear of a transmission, the speed change device being characterized by comprising:

a shift stroke sensor attached to a lost motion mechanism, the lost motion mechanism being associated with a shift rod member of the link mechanism and transmitting an operating force by an elastic member, the shift stroke sensor detecting an amount of expansion/contraction stroke of the shift rod member; a shift spindle sensor for detecting rotation of the shift spindle; and an output control device for controlling output of an internal combustion engine on the basis of a detection signal of the shift stroke sensor and a detection signal of the shift spindle sensor; the shift spindle having a circular cylindrical outer circumferential surface and a detection-target recessed portion formed by recessing a part of the cylindrical outer circumferential surface, the shift spindle sensor being configured to cooperate with the detection-target recessed portion to detect the rotation of the shift spindle.

According to this constitution, because the shift spindle has the detection-target recessed portion in a part of the cylindrical outer circumferential surface of the shift spindle, the shift spindle can be simply assembled in a state in which a rotational position of the detection-target recessed portion adjusted to a predetermined position, without consideration being given to attachment accuracy or the like in the case where a separate rotary plate or the like is attached to the shift spindle as in the related art at the time of assembly of the shift spindle. The shift spindle sensor can consequently detect the rotation of the shift spindle with high accuracy. Hence, it is possible to ensure excellent assemblability of the shift spindle without a high machining accuracy being required, while maintaining an excellent accuracy of detection of the rotation of the shift spindle. Thus, a cost reduction can be achieved.

In addition, because the detection-target recessed portion is formed by recessing a part of the cylindrical outer circumferential surface of the shift spindle, the shift spindle does not have any part projecting outward of the cylindrical outer circumferential surface throughout the entire length of the shift spindle including the detection-target recessed portion. Thus, there is a high degree of freedom of assembly of the shift spindle, and good assemblability of the shift spindle is achieved.

According to a preferred embodiment, the detection-target recessed portion is formed in an end position of the shift spindle, the end position being in proximity of the shift drum driving mechanism.

According to this constitution, the detection-target recessed portion is formed in a position near the shift drum driving mechanism of the shift spindle in which position the rotation of the shift drum, that is, the changing of a speed change stage can be detected with higher accuracy. It is therefore possible to detect the time of completion of the changing of the speed change stage more accurately, and control the output of the internal combustion engine more appropriately.

Preferably, the detection-target recessed portion is formed in a circumferential groove shape including two circumferentially spaced-apart concavely recessed surfaces and an arcuate protruding surface positioned between the two concavely recessed surfaces, the protruding surface forming a part of the cylindrical outer circumferential surface of the shift spindle, and the shift spindle sensor is a limit switch having an actuating portion, the actuating portion being urged in contact with the detection-target recessed portion.

According to this constitution, when the shift spindle is rotated, the limit switch whose actuating portion is in contact with the protruding surface of the detection-target recessed portion has the actuating portion plunging into one of the recessed portions on both sides of the protruding portion. The limit switch can thus detect the rotation of the shift spindle.

According to a preferred embodiment, the detection-target recessed portion is formed in a groove shape having a bottom surface parallel with a plane including a center axis of the shift spindle, the bottom surface being formed by recessing an arcuate surface of a part of the cylindrical outer circumferential surface of the shift spindle, and the shift spindle sensor is a limit switch having an actuating portion, the actuating portion being urged in contact with the bottom surface of the detection-target recessed portion.

According to this constitution, when the shift spindle is rotated, the limit switch whose actuating portion is in contact with a center portion of the flat bottom surface of the detection-target recessed portion has the actuating portion pushed in or retracted while sliding on the revolving flat bottom surface. The limit switch can therefore detect the rotation of the shift spindle. In addition, the detection-target recessed portion of the shift spindle is formed in a groove shape having the flat bottom surface, and is thus easily shaped by machining.

Preferably, a straight line including a movement trajectory of a point of contact of the actuating portion of the shift spindle sensor with the bottom surface of the detection-target recessed portion is located in a position separated and displaced from the center axis of the shift spindle.

The shift spindle has a small rotational angle. Thus, when the straight line including the movement trajectory of the point of contact of the actuating portion of the shift spindle sensor with the bottom surface of the detection-target recessed portion is located in a position separated and displaced from the center axis of the shift spindle, moving distance of the actuating portion of the shift spindle sensor can be increased as much as possible. Therefore detection accuracy can be improved.

According to a preferred embodiment, the detection-target recessed portion is formed in a hole shape by recessing a part of the cylindrical outer circumferential surface of the shift spindle, and the shift spindle sensor is a proximity sensor having a detecting portion positioned in proximity of the detection-target recessed portion.

According to this constitution, when the shift spindle is rotated, the proximity sensor whose detecting portion is opposed to a center portion of the detection-target recessed portion examines an opening edge of the hole of the revolving detection-target recessed portion. The proximity sensor can therefore detect the rotation of the shift spindle.

Because the proximity sensor detects the rotation of the detection-target recessed portion without touching the shift spindle, there is no contact resistance at all, so that the shift spindle sensor does not affect the rotation of the shift spindle at all. In addition, the hole shape is formed by recessing a part of the cylindrical outer circumferential surface of the shift spindle, and is thus easily shaped by machining.

Preferably, the shift spindle is disposed within a transmission case so as to be in parallel with speed change gear shafts rotatably supporting speed change gears of the transmission, and a rotational speed sensor for detecting rotational speed of the speed change gear and the shift spindle sensor are both attached to a common upper wall of the transmission case so as to be displaced from each other in an axial direction of the speed change gear shafts.

According to this constitution, the rotational speed sensor that detects the rotational speed of the speed change gear and the shift spindle sensor are both attached to the common upper wall of the transmission case so as to be displaced from each other in the axial direction of the speed change gear shafts. The rotational speed sensor and the shift spindle sensor can therefore be arranged compactly without interfering with each other.

The transmission may be housed within the crankcase of the internal combustion engine integrally with the internal combustion engine, a clutch housing portion for housing a clutch disposed on an end portion of the speed change gear shaft of the transmission may be formed so as to bulge on a side of the upper wall of the crankcase, the upper wall covering the transmission, and above the upper wall, and the shift spindle sensor may be attached to the upper wall of the crankcase so as to be located adjacent to the clutch housing portion.

According to this constitution, the shift spindle sensor is attached to the upper wall of the crankcase so as to be located near the clutch housing portion. Thus, the side of the shift spindle sensor can be covered by the clutch housing portion bulging above the crankcase. It is therefore possible to protect the shift spindle sensor.

Effects of the Invention

According to the present invention, the shift spindle has the detection-target recessed portion in a part of the cylindrical outer circumferential surface of the shift spindle. Thus, the shift spindle is merely assembled with rotational position of the detection-target recessed portion adjusted to a predetermined position, without consideration being given to attachment accuracy or the like in a case where a separate rotary plate or the like is attached to the shift spindle as in the related art at the time of assembly of the shift spindle. The shift spindle sensor can consequently detect the rotation of the shift spindle with high accuracy. Hence, it is possible to ensure excellent assemblability of the shift spindle without a high machining accuracy being required, while maintaining an excellent accuracy of detection of the rotation of the shift spindle. Thus, a cost reduction can be achieved.

In addition, the detection-target recessed portion is formed by recessing a part of the cylindrical outer circumferential surface of the shift spindle. The shift spindle therefore does not have any part protruding outward of the cylindrical outer circumferential surface throughout the entire length of the shift spindle including the detection-target recessed portion. Thus, there is a high degree of freedom of assembly of the shift spindle, and good assemblability of the shift spindle is achieved.

MODES FOR CARRYING OUT THE INVENTION

An embodiment according to the present invention will hereinafter be described with reference to the drawings.

Figure 1:
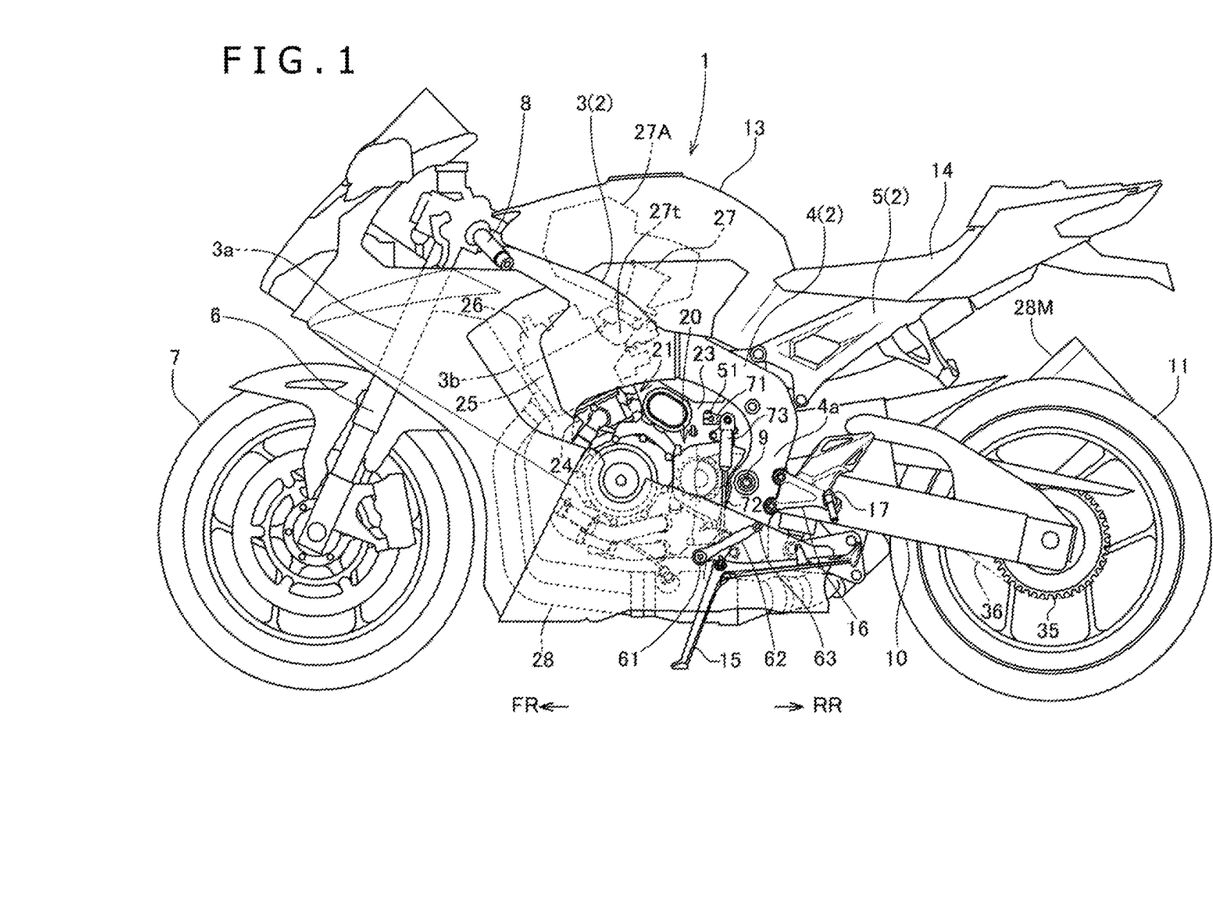
FIG. 1 is a general side view of a motorcycle including a speed change device according to one embodiment of the present invention.

FIG. 1 is a side view of a two-wheel motorcycle 1 as a saddle-riding type vehicle including a speed change device according to one embodiment of the present invention.

Incidentally, in the description of the present specification, a forward direction, a rearward direction, a left direction, and a right direction are in accordance with the normal standard in which a straight-ahead traveling direction of the motorcycle 1 according to the present embodiment is a forward direction. In the drawings, FR denotes the forward direction, RR denotes the rearward direction, LH denotes the left direction, and RH denotes the right direction.

A vehicle body frame 2 of the saddle-riding type motorcycle 1 includes a main frame 3 (a wide frame having a down frame portion 3b) divided into the left and right frame rods from a head pipe portion 3a and extending rearward. A center frame 4 coupled to rear ends of the frame rods of the main frame 3 bend downward to constitute rear fork pivot portions 4a.

Seat rails 5 are extended rearward and obliquely upward from bent portions of the center frame 4.

A front wheel 7 is rotatably supported by lower ends of a front fork 6 steerably supported by the head pipe portion 3a. Steering handlebars 8 are coupled to the front fork 6.

In addition, a rear fork 10 extends rearward, the rear fork 10 having a front end thereof rotatably supported from the rear fork pivot portions 4a of the center frame 4 by a pivot shaft 9. A rear wheel 11 rotatably supported by rear ends of the rear fork 10 is disposed vertically and swingably.

Figure 3:
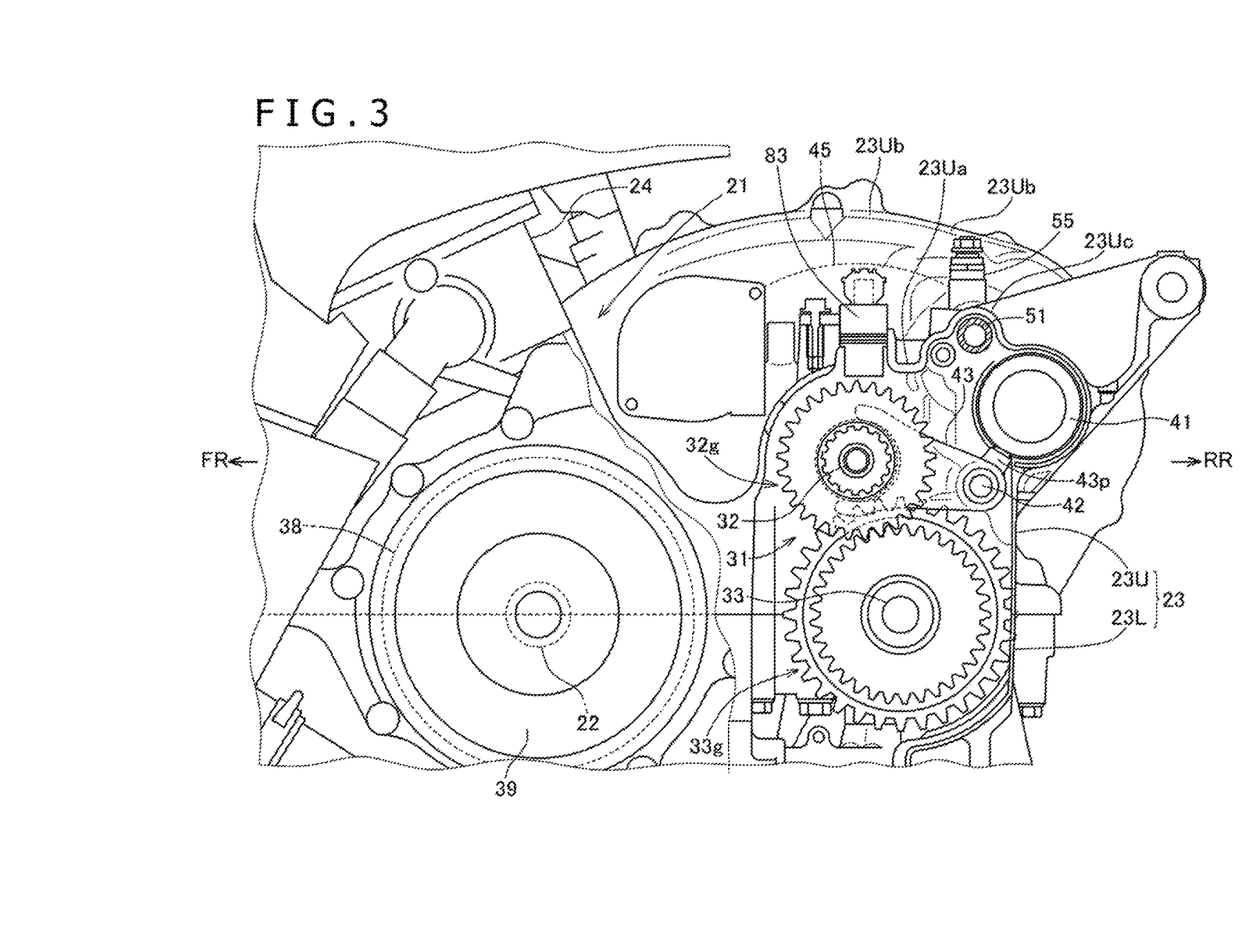
FIG. 3 is a partial side view of the power unit, showing a transmission with a part of a crankcase omitted.

A power unit 20 is mounted in the vehicle body frame 2 of the motorcycle 1. As shown in FIG. 3, the power unit 20 is formed so as to integrally house a manual speed change type multistage transmission (hereinafter referred to simply as a "transmission") 31 within a rear portion of a crankcase 23 of an internal combustion engine 21. The power unit 20 is suspended from the down frame portion 3b on the front side of the main frame 3 and the center frame 4 on the rear side.

A fuel tank 13 is installed on the main frame 3 and the center frame 4 and above the power unit 20. A seat 14 is disposed so as to be supported on the seat rails 5 in the rear of the fuel tank 13.

A side stand 15 is pivotally attached to a lower end of the center frame 4 on the left side in a collapsible and erectable manner.

A support bracket 16 has a front end fastened to a part of the center frame 4 which part is in the rear of the pivot shaft 9 of the rear fork 10. The support bracket 16 projects rearward. A back step 17 on which to put the foot of the driver is provided to the support bracket 16 so as to project outward.

The internal combustion engine 21 is a water-cooled four-cylinder four-stroke-cycle internal combustion engine. The internal combustion engine 21 is mounted in the motorcycle 1 with a crankshaft 22 (FIG. 2 and FIG. 3) of the internal combustion engine 21 oriented in a vehicle width direction (left-right direction).

Figure 2:
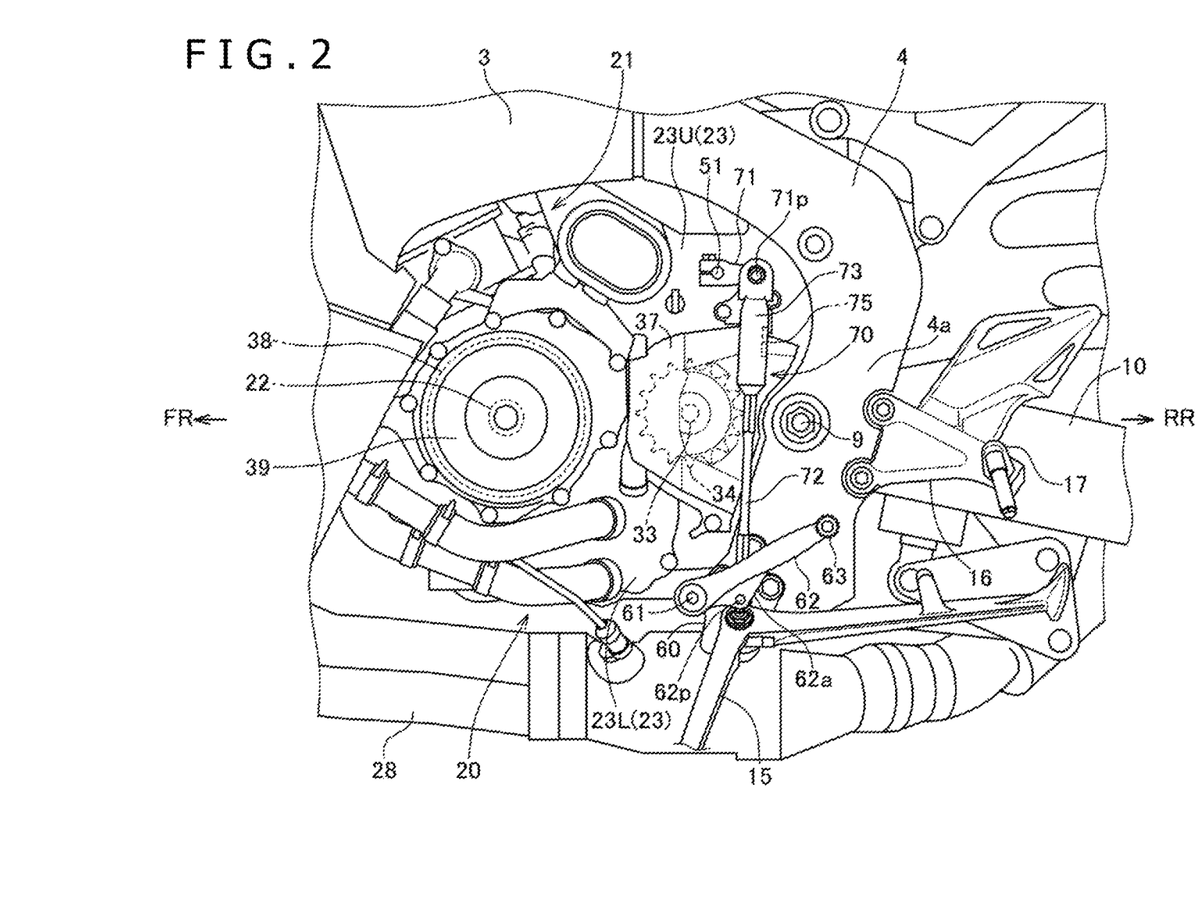
FIG. 2 is an enlarged side view of a power unit mounted on the motorcycle in which a cover for a part of the power unit is omitted.

A cylinder block 24 and a cylinder head 25 are fastened in an erected attitude onto the crankcase 23, which rotatably supports the crankshaft 22, such that the cylinder block 24 and the cylinder head 25 are sequentially stacked on the crankcase 23 with cylinder axes of the cylinder block 24 and the cylinder head 25 slightly inclined forward. A top of the cylinder head 25 is covered by a cylinder head cover 26.

An intake pipe 27 extends upward from the forwardly inclined cylinder head 25 of the internal combustion engine 21 with a throttle body 27t interposed between the intake pipe 27 and the cylinder head 25, and is connected to an air cleaner 27A.

In addition, an exhaust pipe 28 extending frontward from the cylinder head 25 bends downward, further extends rearward, and is connected to a muffler 28M in the rear.

Referring to FIG. 3, the crankcase 23 of the internal combustion engine 21 is constituted of an upper side crankcase half body 23U and a lower side crankcase half body 23L as vertically divided parts. The crankshaft 22 is rotatably supported by mating surfaces of left and right bearing walls of the upper side crankcase half body 23U and the lower side crankcase half body 23L. Among a main shaft 32 and a counter shaft 33 oriented in the left-right direction of the transmission 31, the counter shaft 33 is also rotatably supported, in the rear of the crankshaft 22, by the mating surfaces of the left and right bearing walls of the upper side crankcase half body 23U and the lower side crankcase half body 23L.

The main shaft 32 of the transmission 31 is located above and slightly forward of the counter shaft 33, and is rotatably supported by the upper side crankcase half body 23U.

A group of speed change driving gears 32g rotatably supported by the main shaft 32 and a group of speed change driven gears 33g rotatably supported by the counter shaft 33 in the transmission 31 mesh with each other at all times for each speed change ratio.

The counter shaft 33 is an output shaft of the power unit 20. The counter shaft 33 penetrates the left side bearing wall, and projects leftward. As shown in FIG. 2, an output sprocket 34 is fitted to a left end portion of the counter shaft 33. An output sprocket cover 37 covers the output sprocket 34 from the left side.

The output sprocket 34 is disposed in a position forwardly near the pivot shaft 9 for pivotally supporting the rear fork 10 from the center frame 4. A driving chain 36 (see FIG. 1) is wound between the output sprocket 34 and a driven sprocket 35 fitted to a rear axle of the rear wheel 11. The output of the power unit 20 is transmitted to the rear wheel 11 via the driving chain 36, so that the motorcycle 1 travels.

Referring to FIG. 3, an upper wall 23Ua of the upper side crankcase half body 23U covers the group of speed change driving gears 32g and the group of speed change driven gears 33g of the transmission 31 from above. A rotational speed sensor 83 is provided so as to be fitted into the upper wall 23Ua from above. The rotational speed sensor 83 is disposed above and in proximity of the speed change driving gears 32g rotating integrally with the main shaft 32 of the group of speed change driving gears 32g.

The rotational speed sensor 83 is a proximity sensor. The rotational speed sensor 83 can detect the rotational speed of the main shaft 32 on the basis of the rotation of the teeth of the speed change driving gears 32g.

An alternating current (AC) generator 38 is provided to a left end portion of the crankshaft 22 that penetrates the left side bearing wall of the left and right bearing walls of the crankcase 23, which bearing walls rotatably support the crankshaft 22. An alternating current generator (ACG) cover 39 covers from the left side the AC generator 38 projecting leftward (see FIG. 2 and FIG. 3).

On the other hand, a speed change clutch 45 is provided to a right end portion of the main shaft 32 that penetrates the right side bearing wall of the crankcase 23. The upper side crankcase half body 23U includes a clutch housing portion 23Ub which bulges above the upper wall 23Ua covering the transmission 31 and which covers the outer periphery of the speed change clutch 45 (see FIG. 4 and FIG. 3).

Figure 4:
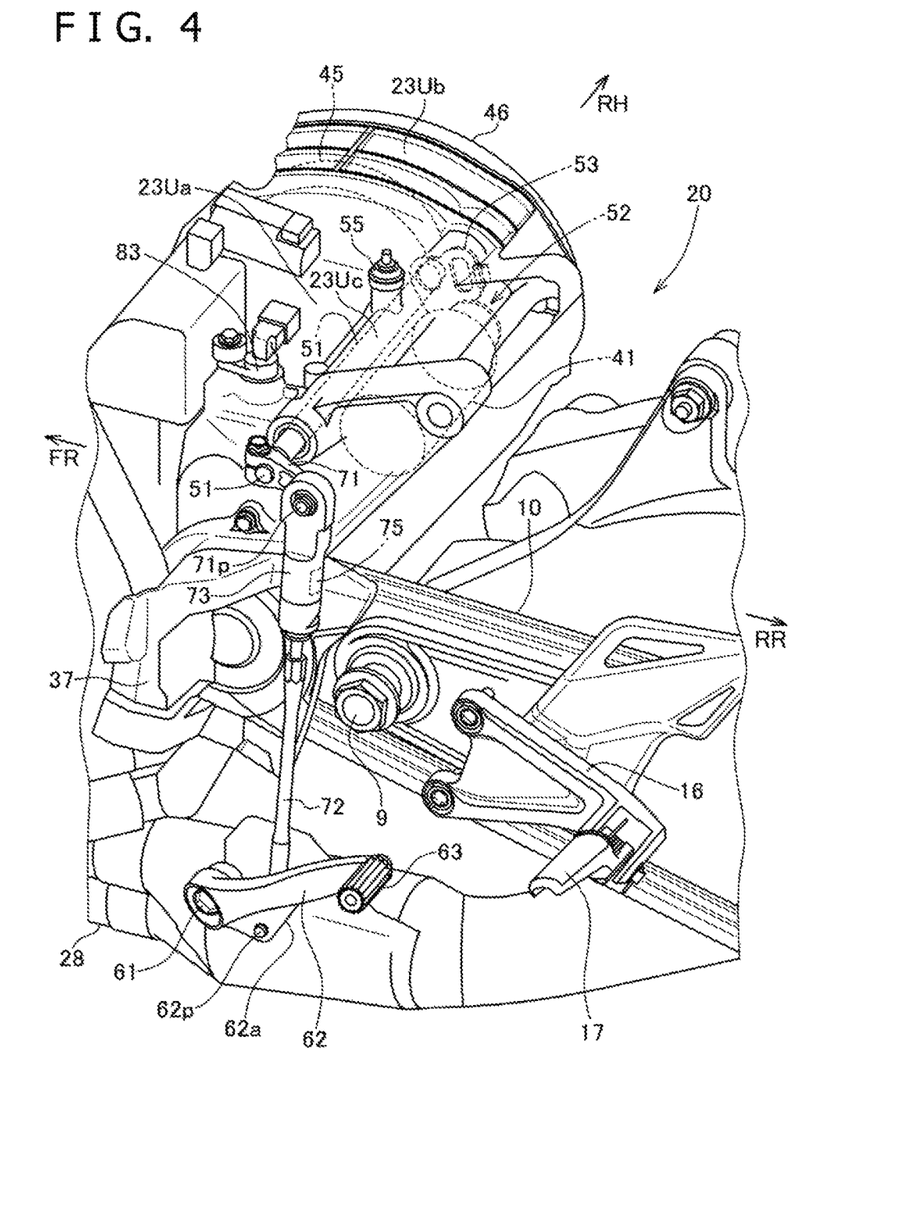
FIG. 4 is a fragmentary perspective view of the power unit, showing a link mechanism.

A clutch cover 46 covers the right side of the speed change clutch 45 (see FIG. 4).

A clutch actuating unit (not shown) is provided to the clutch cover 46, so that the speed change clutch 45 can be actuated by manual operation.

Referring to FIG. 3, the main shaft 32 and the counter shaft 33 are located in the rear of the crankshaft 22 of the engine 21 and are located in an upper position and in a lower position in relation to each other. A shift drum 41 is disposed in a position above the main shaft 32 and in the rear of the counter shaft 33.

A shift fork shaft 42 is disposed obliquely in front of and below the shift drum 41, between the shift drum 41 and the group of speed change driven gears 33g, and in parallel with the main shaft 32 and the counter shaft 33. A shift fork 43 is pivotally supported on the shift fork shaft 42 so as to be slidable in a left-right axial direction.

The shift fork 43 has an engaging pin 43p. The engaging pin 43p slidably engages with a lead groove of the shift drum 41. A bifurcated fork portion of the shift fork 43 engages with a shifter gear slidably and rotatably supported on the main shaft 32 and the counter shaft 33.

Hence, when the shift drum 41 is rotated, the shift fork 43 is guided by the lead groove of the shift drum 41 and thereby moved in the axial direction, so that the shift drum 41 moves the shifter gear. Meshing of a dog clutch of the shifter gear makes meshing of one pair of speed change gears on the main shaft 32 and the counter shaft 33 effective, so that one speed change stage is established.

A shift spindle 51 oriented in the vehicle width direction (left-right direction) is disposed obliquely in front of and above the shift drum 41 so as to be rotatably supported by the crankcase 23.

Referring to FIG. 3 and FIG. 4, the shift spindle 51 is disposed along an inner surface of a bulging portion 23Uc of the upper wall 23Ua of the upper side crankcase half body 23U, the bulging portion 23Uc being oriented in the left-right direction and bulging in the shape of a half cylinder.

Figure 5:
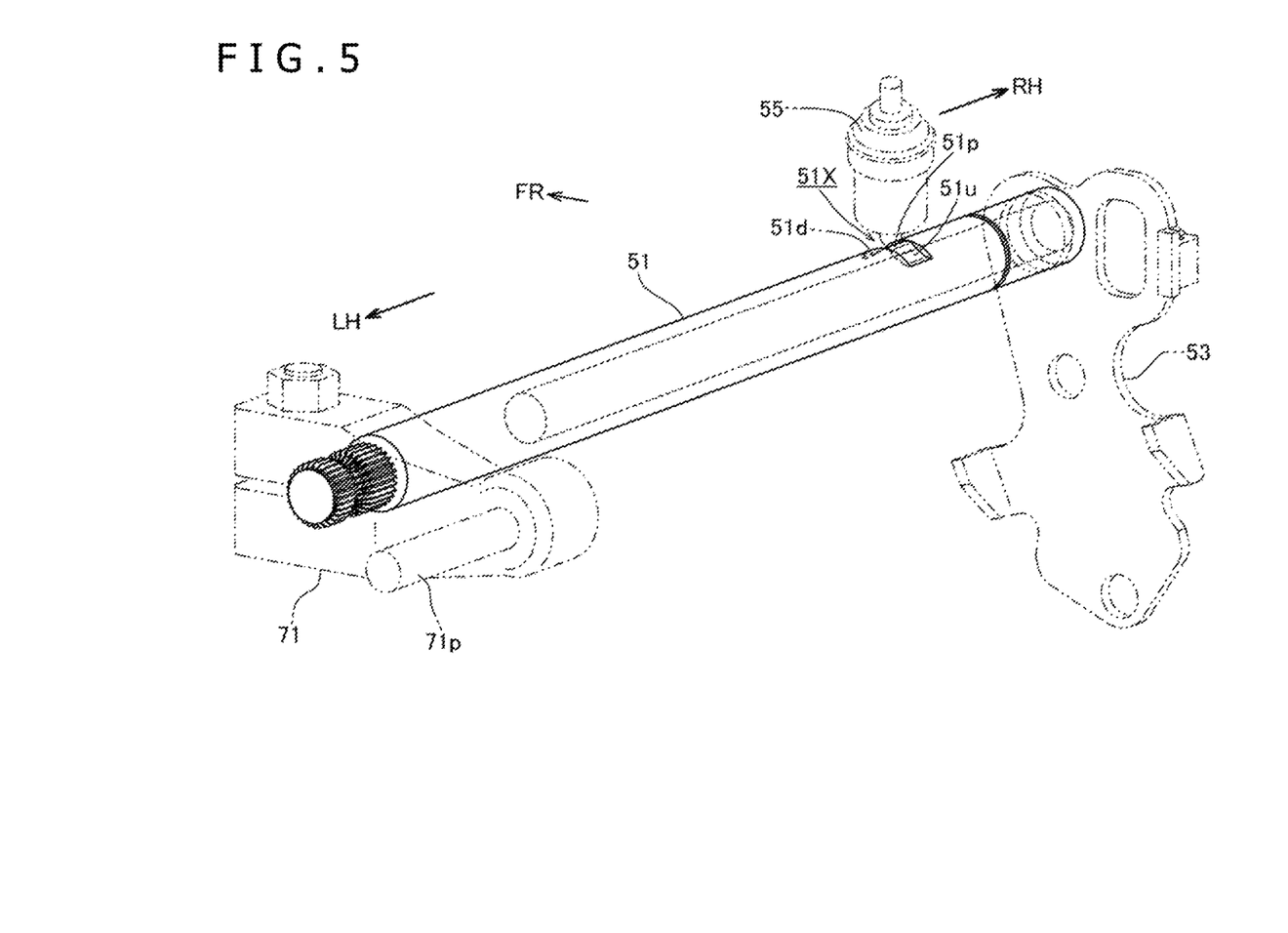
FIG. 5 is a perspective view of a shift spindle.

A ratchet arm 53 is fitted to a right end of the shift spindle 51 (see FIG. 4 and FIG. 5). A shift drum driving mechanism 52, for transmitting power to, and intermittently rotating the shift drum 41, includes the ratchet arm 53 and other components formed between the ratchet arm 53 and a right side axial end portion of the shift drum 41 (see FIG. 4). Operation of the shift drum driving mechanism is relatively conventional, and will be understood by those in the art.

The shift spindle 51 has a detection-target recessed portion 51X formed by recessing a part of a circular cylindrical outer circumferential surface of the shift spindle 51, the detection-target recessed portion 51X being located at a position adjacent to the right end portion of the shift spindle 51, to which right end portion as an output side the ratchet arm 53 for the shift drum driving mechanism 52 is fitted (see FIG. 5).

Figure 6:
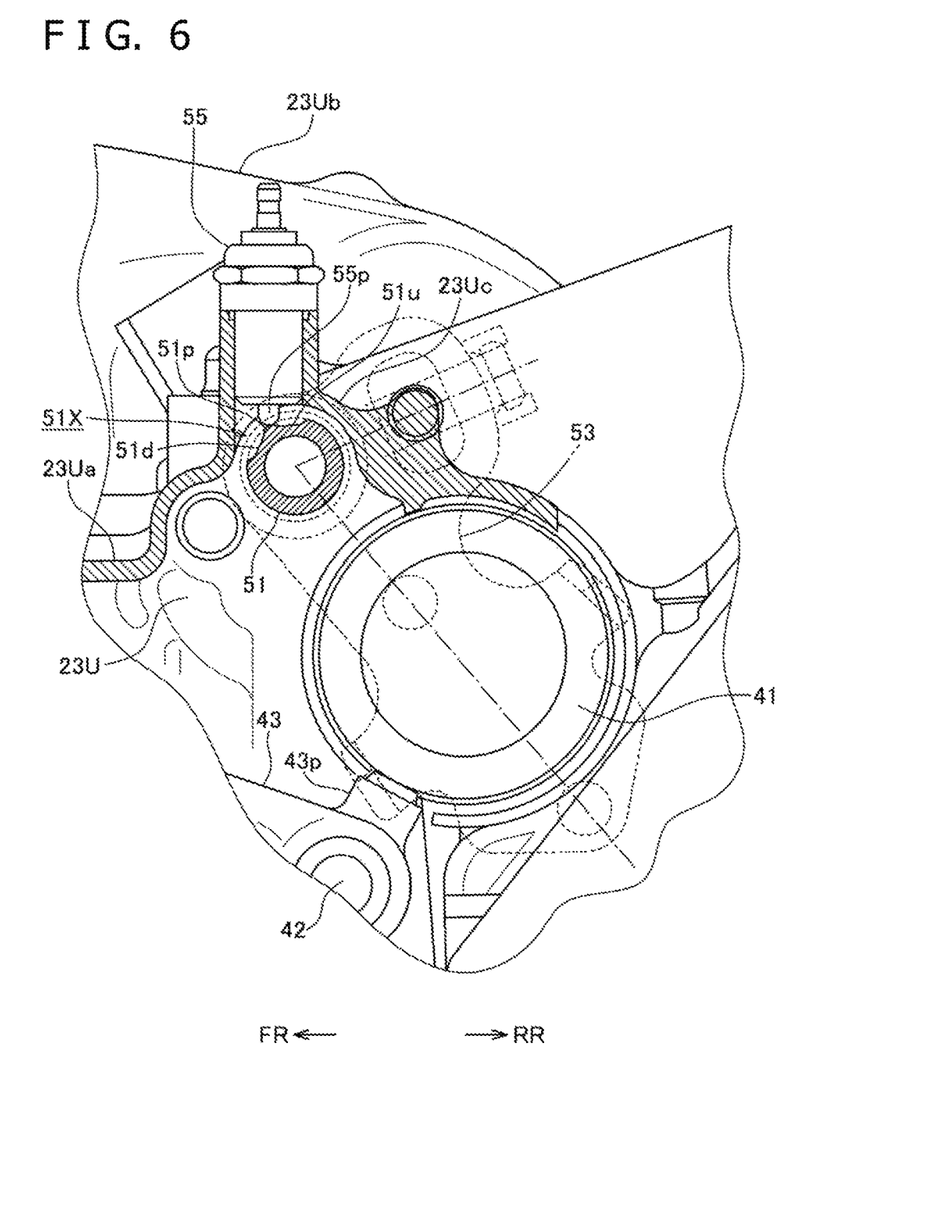
FIG. 6 is a fragmentary sectional view of the power unit.

As shown in FIG. 5 and FIG. 6, the detection-target recessed portion 51X of the shift spindle 51 is made up of a circumferentially spaced-apart concavely recessed surfaces 51u and 51d of a limited width in the longitudinal direction of the shift spindle 51, and a protruding surface 51p formed between the two concavely recessed surfaces 51u and 51d, the protruding surface 51p forming a part of the cylindrical outer circumferential surface of the shift spindle 51.

Referring to FIG. 4, a shift spindle sensor 55 is fitted from above in the bulging portion 23Uc of the upper wall 23Ua of the upper side crankcase half body 23U covering the upper part of the shift spindle 51, the bulging portion 23Uc extending in the left-right direction and having the shape of a half cylinder, and the shift spindle sensor 55 is disposed in a position adjacent to the clutch housing portion 23Ub bulging upward from the upper wall 23Ua. The detection-target recessed portion 51X of the shift spindle 51 is located directly below the shift spindle sensor 55 (see FIG. 5 and FIG. 6).

The shift spindle sensor 55 is a limit switch that has an actuating portion 55p projecting downward, and which is turned on and off when the actuating portion 55p biased or urged by the sensor main body is moved vertically. As shown in FIG. 6, when the shift spindle 51 is in a normal rotational position without speed change operation, the actuating portion 55p of the shift spindle sensor (limit switch) 55 is in contact with the protruding surface 51p of the detection-target recessed portion 51X of the shift spindle 51, and is retracted and in an ON state.

When there is a speed change operation and the shift spindle 51 is rotated, the actuating portion 55p in contact with the protruding surface 51p of the detection-target recessed portion 51X is disengaged from the protruding surface 51p and is caused to project into one of the recessed surfaces 51u and 51d of the detection-target recessed portion 51X, and thus the shift spindle sensor 55 is turned OFF.

Thus, the shift spindle sensor 55 is normally in an ON state. When there is a speed change operation and the shift spindle 51 is rotated, the shift spindle sensor 55 is turned OFF, and thereby detects the rotation of the shift spindle 51.

As shown in FIG. 5, the detection-target recessed portion 51X is located in a position adjacent to the ratchet arm 53 on the output side (right side) in consideration of torsion of the shift spindle 51. It is thus possible to detect rotation of the shift spindle 51 on the side of the shift drum driving mechanism 52, that is, establishment of a speed change stage, with higher accuracy.

As shown in FIG. 4, the shift spindle sensor 55 is fitted in the bulging portion 23Uc of the upper wall 23Ua of the upper side crankcase half body 23U, the bulging portion 23Uc extending in the left-right direction and having the shape of a half cylinder. The shift spindle sensor 55 is opposed to the detection-target recessed portion 51X located in the position adjacent to the ratchet arm 53 of the shift spindle 51, and is disposed in a position adjacent to the clutch housing portion 23Ub bulging above the upper wall 23Ua. It is therefore possible to cover a side of the shift spindle sensor 55 with the clutch housing portion 23Ub bulging above the crankcase 23, and thus to protect the shift spindle sensor 55 from the external force of flying stones and the like.

Incidentally, the rotational speed sensor 83, attached to the upper wall 23Ua of the upper side crankcase half body 23U in a similar manner to the shift spindle sensor 55, is in a laterally central position of the upper wall 23Ua. The rotational speed sensor 83 and the shift spindle sensor 55, attached at the position close to the clutch housing portion 23Ub on the right side, are arranged so as to be apart from each other in the axial direction (left-right direction) of the main shaft 32 and the counter shaft 33. The rotational speed sensor 83 and the shift spindle sensor 55 can thus be arranged compactly without interfering with each other.

The shift spindle 51 penetrates the crankcase 23 leftward, and projects outward.

Referring to FIG. 2 and FIG. 4, below the projecting left end portion of the shift spindle 51, a support bracket 60 is disposed so as to be fastened to a lower end portion of the left side center frame 4. A shift operating lever 62, whose front end is rotatably supported by a shift supporting shaft 61 projecting from the support bracket 60, is disposed so as to extend rearward.

A shift pedal 63 projects leftward from a rear end portion of the shift operating lever 62.

The shift operating lever 62 is located below the left end of the shift spindle 51. The shift operating lever 62 and the shift pedal 63 are coupled to the shift spindle 51 via a link mechanism 70.

Referring to FIG. 4, the link mechanism 70 is formed such that a shift rod member 72 oriented in a substantially vertical direction couples a shift arm 71 to the shift operating lever 62 below, the shift arm 71 being fitted to the left end portion of the shift spindle 51 which left end portion projects leftward from the crankcase 23.

The lower end of the shift rod member 72 is pivotally attached and connected to a supporting piece 62a with a coupling pin 62p formed in a part nearer to the shift supporting shaft 61 than the center portion of the shift operating lever 62. The shift operating lever 62 is rotatably supported by the shift supporting shaft 61 to allow the shift pedal 63 on the rear end of the shift operating lever 62 to swing vertically. The upper end of the shift rod member 72 is pivotally attached and connected to the rear end of the shift arm 71 by a coupling pin 71p. The front end of the shift arm 71 is fitted to the left end portion of the shift spindle 51 (see FIG. 2 and FIG. 4).

A lost motion mechanism 73 that transmits an operating force by an elastic member is interposed in the shift rod member 72.

The lost motion mechanism 73 provides an excellent speed change operation feeling by absorbing the shock of dog abutment of a dog clutch of the transmission 31.

In addition, a shift stroke sensor 75 that detects an amount of expansion/contraction stroke of the shift rod member 72 expanded and contracted by the lost motion mechanism 73 is attached to the lost motion mechanism 73.

The lost motion mechanism 73 is a structure that expands and contracts with a coil spring interposed between an upstream side part and a downstream side part of the lost motion mechanism 73. The shift stroke sensor 75 (FIG. 2) is a linear displacement sensor that detects a relative moving distance between the upstream side part and the downstream side part (amount of expansion/contraction stroke).

Referring to FIG. 2, the back step 17 projects from a position in the rear of and slightly higher than the shift pedal 63 at the rear end of the shift operating lever 62. When a driver seated on the seat 14 in a state of having the left foot of the driver on the back step 17 hooks his toes on the shift pedal 63 from below and kicks up the shift pedal 63 with the back step 17 as a supporting point, the shift operating lever 62 swings upward, so that an upshift operation can be performed. When the driver puts the toes on the shift pedal 63 and presses the shift pedal 63 down, the shift operating lever 62 swings downward, so that a downshift operation can be performed.

That is, at the time of an upshift, the shift operating lever 62 is swung upward. Thus, the shift rod member 72 pivotally attached by the coupling pin 62p is pushed up to swing the shift arm 71 upward via the coupling pin 71p. The shift spindle 51 to which the shift arm 71 is fitted is therefore rotated counterclockwise as viewed from the left side (FIG. 2).

At the time of a downshift, the shift operating lever 62 is swung downward. Thus, the shift rod member 72 pivotally attached by the coupling pin 62p is pulled down to swing the shift arm 71 downward via the coupling pin 71p. The shift spindle 51 to which the shift arm 71 is fitted is therefore rotated clockwise as viewed from the left side (FIG. 2).

Incidentally, as described earlier, the rotation of the shift spindle 51 rotates the shift drum 41 via the shift drum driving mechanism 52, so that a speed change stage of the transmission 31 is changed.

When there is a speed change operation, and the shift operating lever 62 is swung to push up or pull down the shift rod member 72, the coil spring of the lost motion mechanism 73 is compressed or expanded. The shift stroke sensor 75 can therefore detect an amount of this expansion/contraction stroke.

When the speed change operation rotates the shift spindle 51 via the link mechanism 70, the shift spindle sensor 55 examines the detection-target recessed portion 51X formed on the shift spindle 51 at the side of the shift drum driving mechanism 52. Thus, the rotation of the shift spindle 51 at the time of completion of a shift change, in particular, can be detected with high accuracy.

Figure 7:
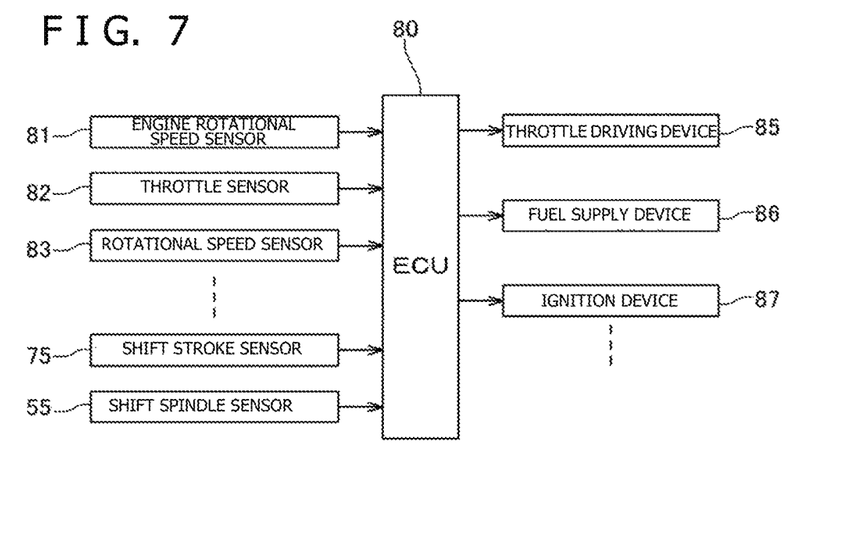
FIG. 7 is a schematic control block diagram of an output control device.

As shown in FIG. 7, detection signals from the shift stroke sensor 75 and the shift spindle sensor 55 are input to an electronic control unit (ECU) 80 together with detection signals of an engine rotational speed sensor 81, which detects a state of operation of the engine 21, a throttle sensor 82, the rotational speed sensor 83, and the like.

The ECU 80 outputs control signals to a throttle driving device 85, a fuel supply device 86, an ignition device 87, and the like to perform driving control thereof.

The amount of expansion/contraction stroke of the shift rod member 72 which amount is detected by the shift stroke sensor 75 is converted into a shift operation load by the ECU 80.

Figure 8:
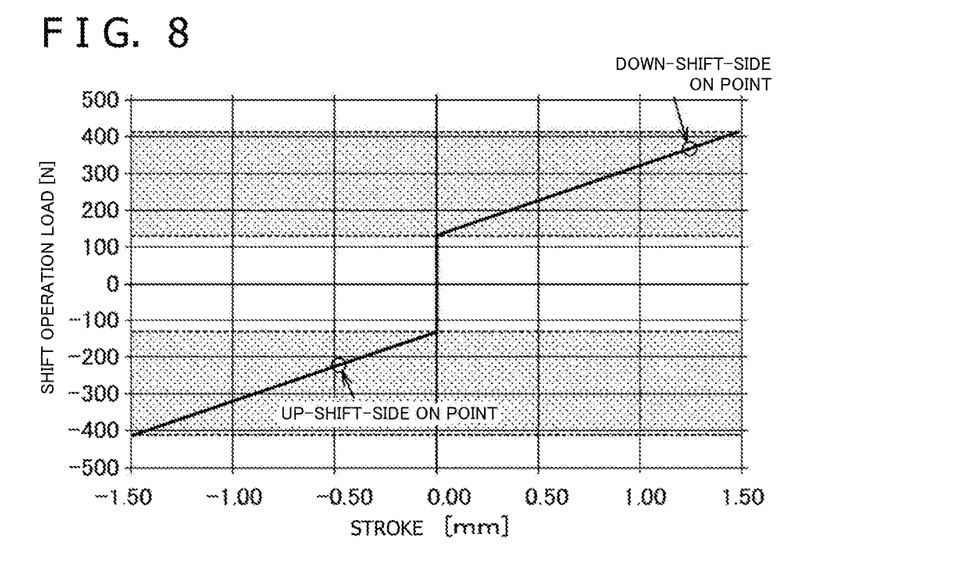
FIG. 8 is a graph showing a relation between an amount of expansion/contraction stroke of a shift rod member and a shift operation load.

FIG. 8 is a graph showing relation between the amount of expansion/contraction stroke and the shift operation load. The axis of abscissas in the graph indicates the amount of stroke. The right side of 0.00 at the center in the graph indicates a positive amount of stroke (amount of expansion stroke) at the time of a downshift. The left side of 0.00 at the center indicates a negative amount of stroke (amount of compression stroke) at the time of an upshift.

The axis of ordinates indicates the shift operation load. The upper side of 0 at the center indicates positive load (expansion load). The lower side of 0 at the center indicates negative load (compression load).

Immediately after the shift pedal 63 is operated, the shift rod member 72 is not expanded or contracted due to bending, play, and the like of coupling mechanisms of the shift pedal 63, the shift operating lever 62, and the shift rod member 72. The shift stroke sensor 75 thus detects zero.

Then, in the case of an upshift, the shift rod member 72 contracts after a predetermined compression load is applied to the shift rod member 72. The compression load subsequently increases gradually. It is thus determined that an upshift operation is performed only after a predetermined threshold value (up-side ON point) set in advance is exceeded. Erroneous detection is thereby prevented.

Similarly, in the case of a downshift, the shift rod member 72 expands after a predetermined expansion load is applied to the shift rod member 72. The expansion load subsequently increases gradually. It is thus determined that a downshift operation is performed only after a predetermined threshold value (down-side ON point) set in advance is exceeded.

In the present speed change device, when the ECU 80 determines at the time of an upshift, in particular, that an upshift operation is performed on the basis of the detection signal of the shift stroke sensor 75, as described above, the ECU 80 prohibits fuel supply by controlling the fuel supply device 86 and delays ignition timing by controlling the ignition device 87, and thus decreases the output of the internal combustion engine 21.

Because the output of the internal combustion engine 21 is decreased, it is possible to reduce a torque transmitted to the transmission and disengage the dog clutch of the transmission smoothly without a clutch operation of the speed change clutch 45. A speed change stage can therefore be changed smoothly and quickly.

Then, when the upshift operation rotates the shift spindle 51 via the link mechanism 70, the shift spindle sensor 55 examines the detection-target recessed portion 51X formed on the shift spindle 51 at the side of the shift drum driving mechanism 52, and the shift spindle sensor 55 is turned off with the actuating portion 55p projecting into the recessed portion 51u. Thus, the output of the internal combustion engine 21 is controlled to be restored quickly by canceling the decrease in the output according to the detection signal of the shift spindle sensor 55.

Also when acceleration is performed at the time of a downshift as in the case of a kickdown, it is determined that a kickdown operation is performed on the basis of the detection signals of the shift stroke sensor 75 and the throttle sensor 82, control as described above is performed to change a speed change stage smoothly and quickly without operating the clutch, and the output can be controlled to be restored quickly on the basis of the detection signal of the shift spindle sensor 55 immediately after the changing of the speed change stage.

Incidentally, the shift spindle 51 can detect rotation on the output side (the side of the shift drum driving mechanism 52) with higher accuracy as the rotation of the shift drum 41, that is, the speed change stage changing operation, than rotation on the input side (the side of the link mechanism 70). Thus, in the present speed change device, the detection-target recessed portion 51X is formed on the shift spindle 51 at the side of the shift drum driving mechanism 52, and the shift spindle sensor 55 examines the detection-target recessed portion 51X.

It is therefore possible to detect a time of completion of the changing of the speed change stage with increase accuracy, cancel the control for the decrease in the output of the internal combustion engine 21 in appropriate timing, and restore the output of the engine 21 as immediately as possible after the speed change stage is changed smoothly.

When a separate rotary plate or the like is attached to the shift spindle as in the related art, the shift spindle 51 must be assembled while a high accuracy of attachment of the rotary plate or the like to the shift spindle is maintained. Therefore the assembly is not easy. However, the present speed change device solves such a problem.

That is, because the shift spindle 51 in the present speed change device has the detection-target recessed portion 51X formed by recessing a part of the cylindrical outer circumferential surface of the shift spindle 51, the shift spindle 51 is merely assembled with rotational position of the detection-target recessed portion 51X adjusted to a predetermined position, without consideration being given to attachment accuracy in the case where a separate rotary plate or the like is attached to the shift spindle as in the related art at the time of assembly of the shift spindle 51. The shift spindle sensor 55 can consequently detect the rotation of the shift spindle 51 with high accuracy. Hence, it is possible to ensure excellent assemblability of the shift spindle 51 without a high machining accuracy being required, while maintaining an excellent accuracy of detection of rotation of the shift spindle 51. Thus, a cost reduction can be achieved.

The detection-target recessed portion 51X is formed in a groove shape having a bottom surface obtained by forming an arcuate surface in the form of a part of the cylindrical outer circumferential surface of the shift spindle 51 into the projection surface 51p so as to divide the two recessed surfaces 51u and 51d that are spaced apart from each other in the circumferential direction. The shift spindle 51 therefore does not have any part projecting radially outward of the cylindrical outer circumferential surface throughout the entire length of the shift spindle 51 including the detection-target recessed portion 51X. Thus, there is a high degree of freedom of assembly of the shift spindle 51, and excellent assemblability of the shift spindle 51 is achieved.

Another embodiment will next be described with reference to FIG. 9.

A shift spindle 101 of a speed change device according to the present embodiment is provided with a detection-target recessed portion 101X formed in a groove shape having a bottom surface 101p parallel with a plane including a central axis 101c of the shift spindle 101, the bottom surface 101p being formed by recessing an arcuate surface of a part of a circular cylindrical outer circumferential surface of the shift spindle 101.

A shift spindle sensor 105 is a limit switch. As shown in FIG. 9, the shift spindle sensor 105 is fitted in a bulging portion 23Uc of an upper wall 23Ua of an upper side crankcase half body 23U, and is a limit switch. An actuating portion 105p of the shift spindle sensor 105 projects downward and is in contact with the bottom surface 101p of the detection-target recessed portion 101X of the shift spindle 101.

Figure 9:
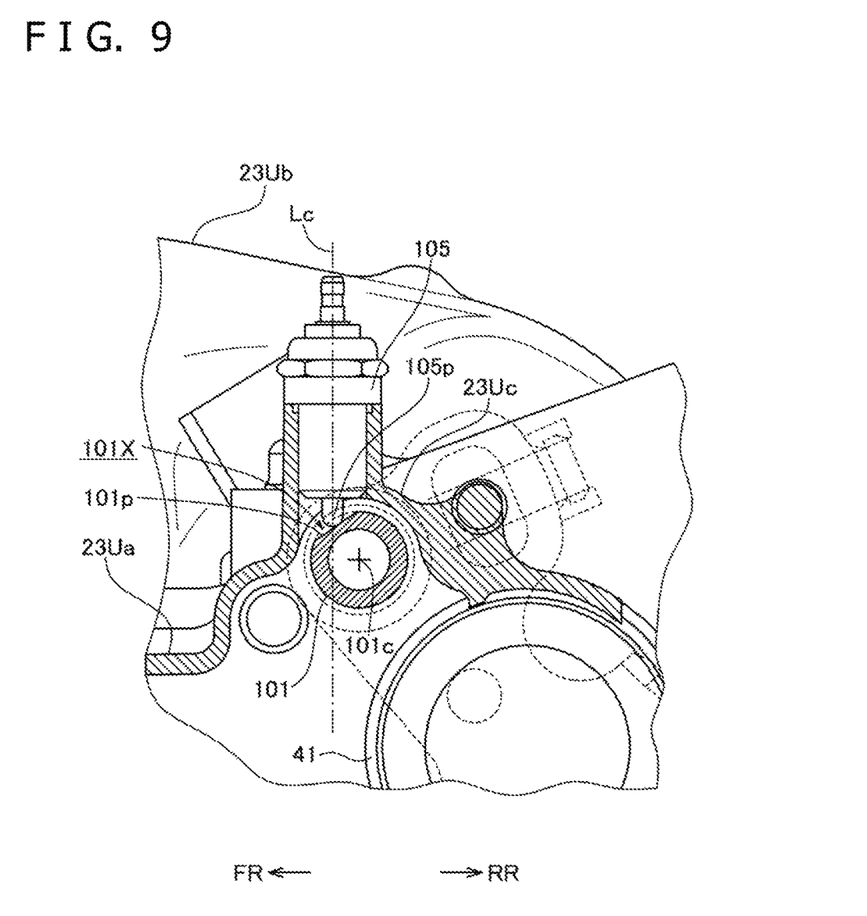
FIG. 9 is a fragmentary sectional view of another embodiment of the present invention.

Referring to FIG. 9, a straight line Lc including a movement trajectory of a point of contact of the actuating portion 105p of the shift spindle sensor 105, with the bottom surface 101p of the detection-target recessed portion 101X, is displaced from the center axis 101c of the shift spindle 101.

FIG. 9 shows a normal state in which the shift spindle 101 is not rotated, in which normal state the actuating portion 105p projects to and is in contact with a center of the inclined flat bottom surface 101p of the detection-target recessed portion 101X, and the shift spindle sensor (limit switch) 105 is in an ON state.

When the shift spindle 101 is rotated, the actuating portion 105p is pushed in or retracted while sliding on the flat bottom surface 101p of the revolving detection-target recessed portion 101X. Hence, the shift spindle sensor (limit switch) 105 is turned OFF, and is thereby able to detect the rotation of the shift spindle.

The shift spindle 101 has a small rotational angle. Thus, when the straight line Lc including the movement trajectory of the point of contact of the actuating portion 105p of the shift spindle sensor (limit switch) 105 with the bottom surface 101p of the detection-target recessed portion 101X is located in a position separated and displaced from the center axis 101c of the shift spindle 105, the moving distance of the actuating portion 105p of the shift spindle sensor 105 can be increased as much as possible. Therefore detection accuracy can be improved.

The detection-target recessed portion 101X of the shift spindle 101 is formed in a groove shape having the flat bottom surface 101p, and is thus easily shaped by machining.

In addition, the detection-target recessed portion 101X is formed by recessing an arcuate surface of a part of the cylindrical outer circumferential surface of the shift spindle 101. Thus, the detection-target recessed portion 101X does not have any part projecting radially outward of the cylindrical outer circumferential surface of the shift spindle 101, so that an excellent assemblability is achieved.

Yet another embodiment will be described with reference to FIG. 10.

A shift spindle 121 of a speed change device according to the present embodiment has a simple hole-shaped detection-target recessed portion 121X formed by recessing a part of a cylindrical outer circumferential surface of the shift spindle 121. The hole is a radially extending hole.

A shift spindle sensor 125 is a proximity sensor. The shift spindle sensor 125 is fitted in a bulging portion 23Uc of an upper wall 23Ua of an upper side crankcase half body 23U with a detecting portion 125p of the shift spindle sensor (proximity sensor) 125 brought into proximity to the detection-target recessed portion 121X.

Figure 10:
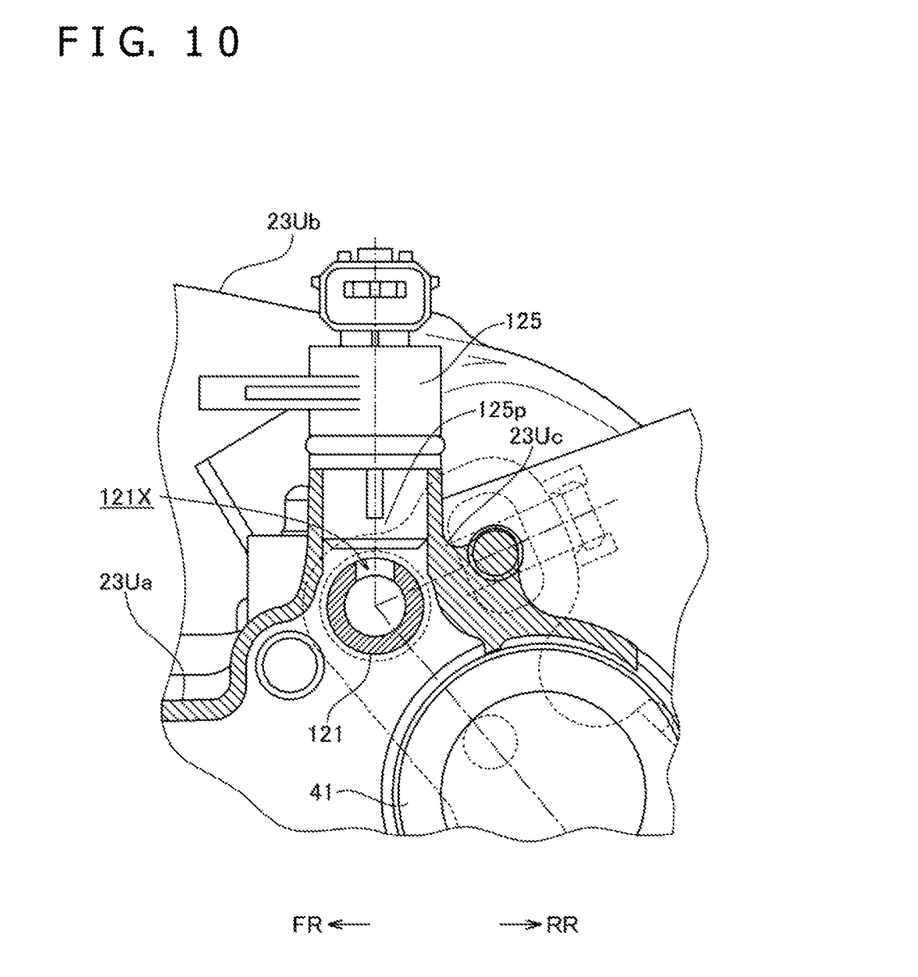
FIG. 10 is a fragmentary sectional view of yet another embodiment of the present invention.

FIG. 10 shows a normal state in which the shift spindle 121 is not rotated, in which normal state the shift spindle sensor (proximity sensor) 125 has the detecting portion 125p directed to the center of the detection-target recessed portion 121X.

When the shift spindle 121 is rotated, the shift spindle sensor (proximity sensor) 125 examines an opening edge of the detection-target recessed portion 121X. The shift spindle sensor (proximity sensor) 125 can therefore detect the rotation of the shift spindle 121.

Because the shift spindle sensor (proximity sensor) 125 detects the rotation of the detection-target recessed portion 121X without touching the shift spindle 121, there is no contact resistance at all, so that the shift spindle sensor (proximity sensor) 125 does not affect the rotation of the shift spindle 121 at all.

In addition, the shift spindle 121 has the detection-target recessed portion 121X formed by recessing a part of the cylindrical outer circumferential surface of the shift spindle 121. The shift spindle 121 therefore does not have any part projecting radially outward of the cylindrical outer circumferential surface of the shift spindle 121. Thus, excellent assemblability of the shift spindle 121 is achieved, and it is easy to shape the shift spindle 121 by machining.

The speed change devices according to the embodiments of the present invention have been described above. However, modes of the present invention are not limited to the foregoing embodiments, but include various modes carried out within the spirit of the present invention.

DESCRIPTION OF REFERENCE SYMBOLS

1 . . . Motorcycle, 16 . . . Support bracket, 17 . . . Back step,
20 . . . Power unit, 21 . . . Internal combustion engine, 22 . . . Crankshaft, 23 . . . Crankcase, 23U . . . Upper side crankcase half body, 23Ua . . . Upper wall, 23Ub . . . Clutch housing portion, 23Uc . . . Bulging portion, 23L . . . Lower side crankcase half body,
31 . . . Transmission, 32 . . . Main shaft, 33 . . . Counter shaft (output shaft), 37 . . . Output sprocket cover, 38 . . . AC generator, 39 . . . ACG cover,
41 . . . Shift drum, 43 . . . Shift fork, 45 . . . Speed change clutch, 46 . . . Clutch cover,
51 . . . Shift spindle, 51X . . . Detection-target recessed portion, 52 . . . Shift drum driving mechanism, 53 . . . Ratchet arm, 55 . . . Shift spindle sensor, 60 . . . Support bracket, 61 . . . Shift supporting shaft, 62 . . . Shift operating lever, 63 . . . Shift pedal, 64 . . . Pin, 70 . . . Link mechanism, 71 . . . Shift arm, 72 . . . Shift rod member, 73 . . . Lost motion mechanism, 75 . . . Shift stroke sensor, 80 . . . ECU, 81 . . . Engine rotational speed sensor, 82 . . . Throttle sensor, 83 . . . Rotational speed sensor, 85 . . . Throttle driving device, 86 . . . Fuel supply device, 87 . . . Ignition device, 101 . . . Shift spindle, 101X . . . Detection-target recessed portion, 105 . . . Shift spindle sensor (limit switch), 121 . . . Shift spindle, 121X . . . Detection-target recessed portion, 125 . . . Shift spindle sensor (proximity sensor).

The invention claimed is:

1. A speed change device for a motorcycle including:
a shift operating member,
a shift spindle,
a link mechanism including a shift rod member operatively connecting the shift operating member to the shift spindle so as to rotate the shift spindle according to an operation of the shift operating member,
a shift drum,
a shift drum driving mechanism comprising a ratchet arm fitted to the shift spindle for rotating the shift drum by intermittently transmitting rotation of the shift spindle to the shift drum, and
a shift fork for engaging with the shift drum to select one speed change stage by transmitting rotation of the shift drum to a shifter gear of a transmission, wherein the speed change device comprises:
a shift stroke sensor attached to a lost motion mechanism, the lost motion mechanism being associated with the shift rod member of the link mechanism and having an elastic member for transmitting an operating force, the shift stroke sensor configured to detect an amount of an expansion/contraction stroke of the shift rod member;
a shift spindle sensor for detecting rotation of the shift spindle;
an output control device for controlling output of an internal combustion engine on a basis of a detection signal of the shift stroke sensor and a detection signal of the shift spindle sensor;
the shift spindle having a circular cylindrical outer circumferential surface and a detection-target recessed portion formed by recessing a part of the cylindrical outer circumferential surface,
the shift spindle sensor being configured to cooperate with the detection-target recessed portion to detect the rotation of the shift spindle.

2. The speed change device for a motorcycle according to claim 1, wherein the detection-target recessed portion is formed in an end position of the shift spindle, the end position being in proximity to the shift drum driving mechanism.

3. The speed change device for a motorcycle according to claim 1, wherein:
the detection-target recessed portion is formed in a circumferential groove shape including two circumferentially spaced-apart concavely recessed surfaces, and an arcuate protruding surface positioned between the two concavely recessed surfaces, the protruding surface forming a part of the cylindrical outer circumferential surface of the shift spindle, and
the shift spindle sensor comprises a limit switch having an actuating portion, the actuating portion being urged in selective contact with the detection-target recessed portion.

4. The speed change device for a motorcycle according to claim 2, wherein:
the detection-target recessed portion is formed in a circumferential groove shape including two circumferentially spaced-apart concavely recessed surfaces, and an arcuate protruding surface positioned between the two concavely recessed surfaces, the protruding surface forming a part of the cylindrical outer circumferential surface of the shift spindle, and
the shift spindle sensor comprises a limit switch having an actuating portion, the actuating portion being urged in selective contact with the detection-target recessed portion.

5. The speed change device for a motorcycle according to claim 1, wherein:
the detection-target recessed portion is formed in a groove shape having a bottom surface parallel with a plane including a center axis of the shift spindle, the bottom surface being formed by recessing an arcuate surface of a part of the cylindrical outer circumferential surface of the shift spindle, and
the shift spindle sensor comprises a limit switch having an actuating portion, the actuating portion being urged in selective contact with the bottom surface of the detection-target recessed portion.

6. The speed change device for a motorcycle according to claim 2, wherein:
the detection-target recessed portion is formed in a groove shape having a bottom surface parallel with a plane including a center axis of the shift spindle, the bottom surface being formed by recessing an arcuate surface of a part of the cylindrical outer circumferential surface of the shift spindle, and
the shift spindle sensor comprises a limit switch having an actuating portion, the actuating portion being urged in selective contact with the bottom surface of the detection-target recessed portion.

7. The speed change device for a motorcycle according to claim 5, wherein a straight line including a movement trajectory of a point of contact of the actuating portion of the shift spindle sensor with the bottom surface of the detection-target recessed portion is located in a position separated and displaced from the center axis of the shift spindle.

8. The speed change device for a motorcycle according to claim 1, wherein:
the detection-target recessed portion is formed in a hole shape by recessing a part of the cylindrical outer circumferential surface of the shift spindle, and
the shift spindle sensor is a proximity sensor having a detecting portion positioned in proximity of the detection target recessed portion.

9. The speed change device for a motorcycle according to claim 2, wherein:
the detection-target recessed portion is formed in a hole shape by recessing a part of the cylindrical outer circumferential surface of the shift spindle, and
the shift spindle sensor is a proximity sensor having a detecting portion positioned in proximity of the detection target recessed portion.

10. The speed change device for a motorcycle according claim 1, wherein:
the shift spindle is disposed within a transmission case so as to be in parallel with speed change gear shafts rotatably supporting speed change gears of the transmission, and
a rotational speed sensor, for detecting rotational speed of the speed change gear, and the shift spindle sensor are both attached to a common upper wall of the transmission case so as to be displaced from each other in an axial direction of the speed change gear shafts.

11. The speed change device for a motorcycle according to claim 2, wherein:
the shift spindle is disposed within a transmission case so as to be in parallel with speed change gear shafts rotatably supporting speed change gears of the transmission, and
a rotational speed sensor, for detecting rotational speed of the speed change gear, and the shift spindle sensor are both attached to a common upper wall of the transmission case so as to be displaced from each other in an axial direction of the speed change gear shafts.

12. The speed change device for a motorcycle according to claim 3, wherein:
the shift spindle is disposed within a transmission case so as to be in parallel with speed change gear shafts rotatably supporting speed change gears of the transmission, and
a rotational speed sensor, for detecting rotational speed of the speed change gear, and the shift spindle sensor are both attached to a common upper wall of the transmission case so as to be displaced from each other in an axial direction of the speed change gear shafts.

13. The speed change device for a motorcycle according to claim 5, wherein:
the shift spindle is disposed within a transmission case so as to be in parallel with speed change gear shafts rotatably supporting speed change gears of the transmission, and
a rotational speed sensor, for detecting rotational speed of the speed change gear, and the shift spindle sensor are both attached to a common upper wall of the transmission case so as to be displaced from each other in an axial direction of the speed change gear shafts.

14. The speed change device for a motorcycle according to claim 7, wherein:
the shift spindle is disposed within a transmission case so as to be in parallel with speed change gear shafts rotatably supporting speed change gears of the transmission, and
a rotational speed sensor, for detecting rotational speed of the speed change gear, and the shift spindle sensor are both attached to a common upper wall of the transmission case so as to be displaced from each other in an axial direction of the speed change gear shafts.

15. The speed change device for a motorcycle according to claim 8, wherein:
the shift spindle is disposed within a transmission case so as to be in parallel with speed change gear shafts rotatably supporting speed change gears of the transmission, and
a rotational speed sensor, for detecting rotational speed of the speed change gear, and the shift spindle sensor are both attached to a common upper wall of the transmission case so as to be displaced from each other in an axial direction of the speed change gear shafts.

16. The speed change device for a motorcycle according to claim 10, wherein:
the transmission is housed within a crankcase of the internal combustion engine integrally with the internal combustion engine,
a clutch housing portion for housing a clutch disposed on an end portion of the speed change gear shaft of the transmission is formed so as to bulge on a side of an upper wall of the crankcase, the upper wall covering the transmission, and
the shift spindle sensor is attached to the upper wall of the crankcase so as to be located adjacent to the clutch housing portion.

\* \* \* \* \*